(No Model.)
G. RUSSELL & D. R. WOOD.
MACHINE FOR MAKING PIPE.
No. 314,980. Patented Mar. 31, 1885.
3 Sheets—Sheet 1.
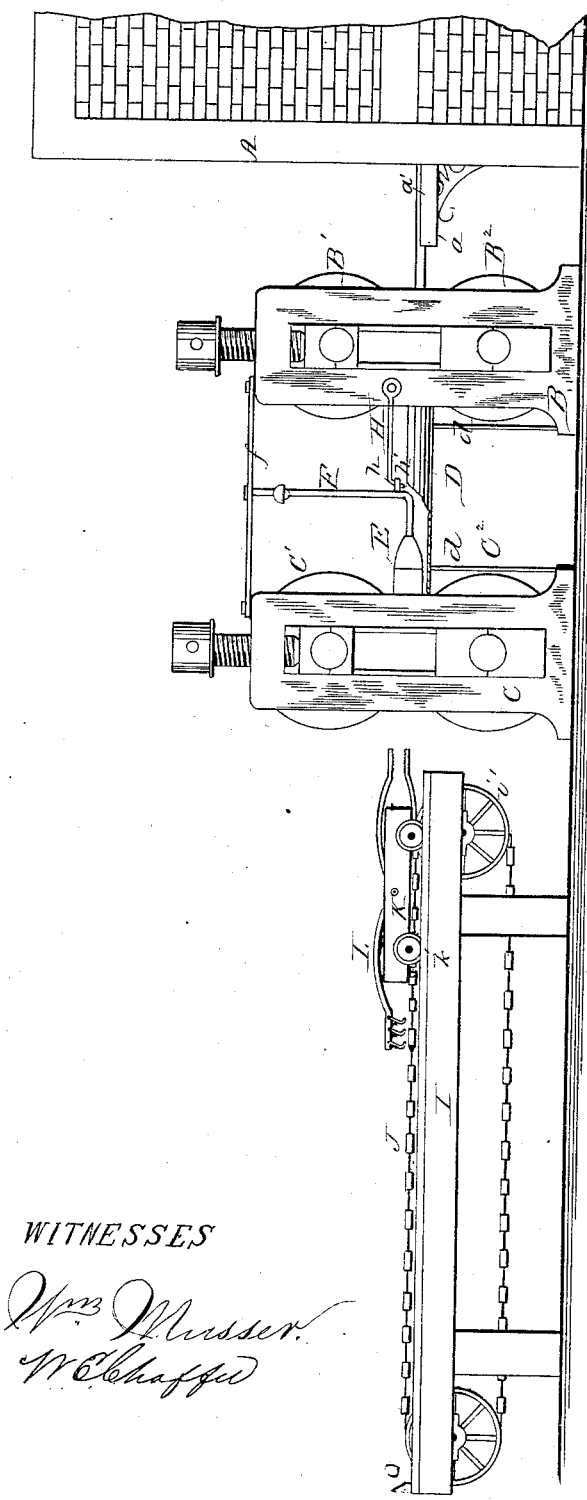
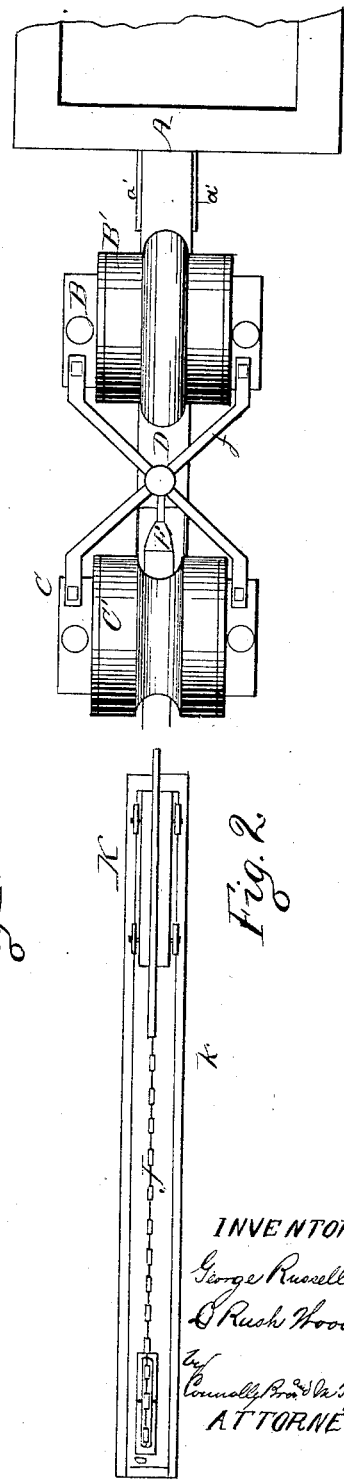
WITNESSES
INVENTORS
George Russell
D Rush Wood
by
Connolly Bro & Va Tighe
ATTORNEYS (No Model.) 3 Sheets—Sheet 2.
G. RUSSELL & D. R. WOOD.
MACHINE FOR MAKING PIPE.
No. 314,980. Patented Mar. 31, 1885.
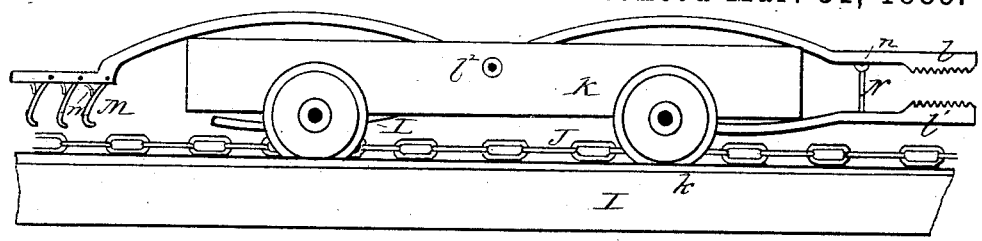
Fig. 3
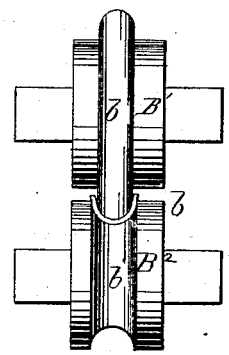
Fig. 4
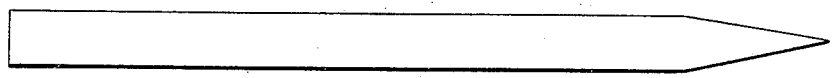
Fig. 5
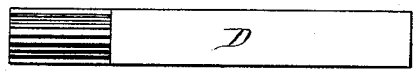
WITNESSES
Wm Musser
W E Chaffin
INVENTORS
George Russell
D. Rush Wood
by Connolly Bros & McTighe
ATTORNEYS (No Model.)

G. RUSSELL & D. R. WOOD.

3 Sheets—Sheet 3.

MACHINE FOR MAKING PIPE.

No. 314,980. Patented Mar. 31, 1885.

WITNESSES
G. Smith
T. J. Maloney

INVENTORS
George Russell
D. Rush Wood
Connolly Bros & McTighe
ATTORNEYS

UNITED STATES PATENT OFFICE.

GEORGE RUSSELL AND D. RUSH WOOD, OF McKEESPORT, PENNSYLVANIA; SAID WOOD ASSIGNOR OF ONE-HALF OF HIS RIGHT TO SAID RUSSELL.

MACHINE FOR MAKING PIPE.

SPECIFICATION forming part of Letters Patent No. 314,980, dated March 31, 1885.

Application filed May 26, 1884. (No model.)

*To all whom it may concern:*

Be it known that we, GEORGE RUSSELL and D. RUSH WOOD, of McKeesport, in the county of Allegheny and State of Pennsylvania, have invented certain new and useful Improvements in Machines for Making Pipe; and we do hereby declare that the following is a full, clear, and exact description of the invention, which will enable others skilled in the art to which it appertains to make and use the same, reference being had to the accompanying drawings, which form a part of this specification.

Our invention has relation to that class of machines for forming and welding pipe in which are employed two sets of rolls, one set for bending the blank and the other set for welding the seam of the pipe, a guiding-tube and a welding-ball being located between the two sets of rolls; and our invention consists in the novel construction, combination, and arrangement of devices, as hereinafter described and claimed, having reference particularly to the combination, with the forming and welding rolls and a welding-ball appropriately arranged, of certain devices for grasping the end of the pipe and drawing it through the rolls.

Figure 6:
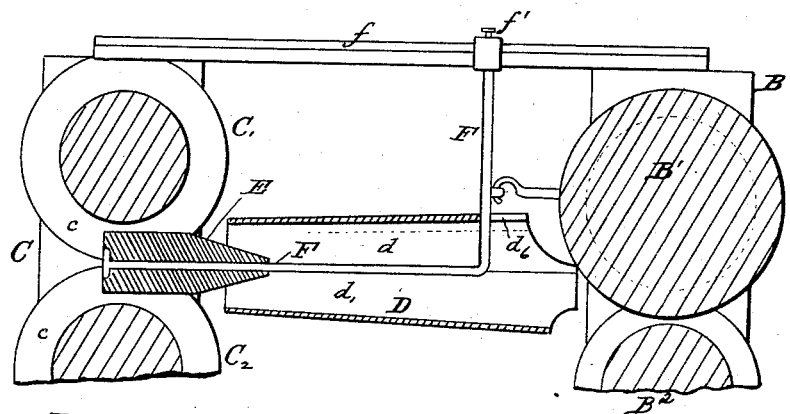
Figure 7:
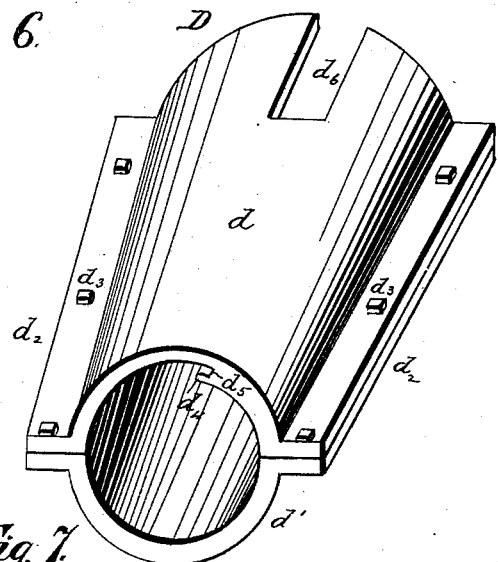
Figure 8:
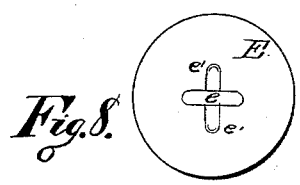

Referring to the accompanying drawings, Figure 1 is a side view of a machine embodying our improvements; Fig. 2, a top view of the same; Fig. 3, a side view of the carriage; Fig. 4, a detail view of the forming-rolls; Fig. 5, a view of the blank before passing through the forming-rolls; Fig. 6, a sectional view of the rolls, the guiding and forming tube, and the welding-ball; Fig. 7, a perspective view of the guiding and forming tube; Fig. 8, an end view of the welding-ball.

A designates the furnace wherein the blanks are heated before passing them to the machine. Said furnace is of the usual construction and is provided with an opening in its rear, through which are successively pushed and pulled the blanks as they are fed to the rolls.

B designates the housings of the first or forming rolls, and B' B² the said forming-rolls, the upper roll, B', having a tongue, $b$, and the lower roll, B², a semicircular groove, $b'$, leaving a semicircular space between the said tongue and groove.

C' C² are the welding-rolls, suitably mounted in a housing, C, and each formed with a semicircular groove, $c$, leaving a circular opening between the rolls of the size of the pipe to be formed.

D designates the guiding and forming tube, which is set between the forming and welding rolls. Said tube is shown in position in Fig. 6 of the drawings. This tube is composed of two halves, $d\ d'$, each having lateral flanges $d^2\ d^2$, through which pass bolts $d^3\ d^3$, securing the two halves together. As shown, the tube is of tapering form and is of such length that it extends from one set of rolls to the other, being as close to each as possible. The interior of the tube throughout its entire length is of helical form, so as to form at the top of the tube a longitudinal shoulder, $d^4$, on the vertical side of which is formed a longitudinal slot, $d^5$. A slot, $d^6$, is cut in the larger end of the tube to receive the welding-ball support. The welding-ball consists of an oblong block of metal, round in cross-section and of a diameter corresponding to the inside diameter of the pipe to be made. Said ball and its supports are shown shown in Fig. 6 of the drawings, wherein E designates the ball, and F the rod upon which the said ball is supported. The ball has an oblong opening, $e$, through its center, and at its forward end notches $e'\ e'$, and the supporting-rod F is formed at its end with a T, which is of such size as to just pass through the oblong opening in the ball, the latter being secured to the rod by passing it along over the end of said rod until the T on the end of the latter projects through the end of the ball, when the latter is secured by turning it a quarter-revolution on its axis, the T on the rod fitting in the notches $e'\ e'$ of the ball and effectually retaining it in position. The ball when in position between the rods is set on a line with the central axis of the tube D and partly within said tube, the supporting-rod F passing out through the slot $d^6$ to a frame, $f$, which is secured to the housings of the rolls. The rod F at its upper end slides along on the frame $f$ and is secured at the desired point by a set-screw, $f'$.

When it is desired to remove the ball, which is generally necessary after each section of pipe is completed, the rod F is slid along the frame until the ball projects through the opening in the welding-rolls, when it is seized with a pair of tongs, turned a quarter-revolution, and drawn off.

The guiding and welding tube just described is adapted for use where the pipe is to be lap-welded, the spiral formation of the interior of the tube, and the slot in the longitudinal shoulder causing one of the edges of the blank to lap over the other. When the pipe is to be butt-welded, the tube is made circular in cross-section, the longitudinal shoulder being dispensed with.

The advantage of the construction shown is that the tube, after leaving the forming-rolls, being then only partially formed, is received in the spiral tube and its formation completed by means of the said tube, and one of its edges lapped over the other, thus making it ready for the action of the welding-rolls and the welding-ball, which, acting in conjunction, perfectly weld the pipe along its seam. The welding-ball being easily removable from its supports permits of the speedy operation of the machine, as the replacement of the ball may be made in a very few seconds. The free end of the welding-ball projects slightly into the opening $c$ between the rolls $C'$ $C^2$, its end being on a line slightly beyond the center of the two rolls. A rod, H, attached to the housing B and bent out in front of the roll $C'$, has a hook, $h$, which hooks into an eye, $h'$, on the rod F, and serves to prevent the welding-ball from being drawn too far between the welding-rolls.

The rolls and their gearing are attached in the ordinary manner, and need not be particularly described.

In the rear of rolls $C'$ $C^2$ are arranged the feeding devices, by means of which the pipe is drawn through the rolls, such devices comprising an endless chain running over pulleys, which are geared to the rolls, a carriage running on rails set on each side of the endless chain, and a pair of gripping-tongs fixed to the carriage and constructed and arranged to grip the pipe as it comes first from the welding-rolls and pull it through the rolls with a steady motion.

I represents the frame upon which the endless chain and the traveling carriage are supported, and $i$ $i'$ the pulleys over which the said chain runs, the pulley $i$ being so geared as to cause the chain to run at a little faster rate than the rolls, so as to take up the increased length caused by the pressure of the welding-rolls.

J designates the chain; K, the carriage, and $k$ $k$ the rails on which the said carriage runs. L and L' are the two arms of the gripping-tongs. Said tongs are attached and carried by the carriage K, the lower arm, L, being fixed thereto, and the upper arm, L', pivoted to the lower at $l^2$. The arm L' is somewhat longer than the arm L, and projects out some distance beyond the end of the carriage K, and to the lower side of said arm are pivoted several hooks, M, having springs $m$ $m$ at their backs. The jaws of the tongs (lettered $l$ $l$) project forward in front of the carriage K, and are held apart when not grasping the pipe by a pin, N, pivoted at $n$ to the upper jaw $l$.

The blank from which the pipe is made is shown in Fig. 6 of the drawings, and it has its forward end cut away to a point, as shown, so as to allow the tongs to grasp it with facility when it projects through the welding-rolls.

The operation of our invention is as follows: As the blanks become heated to the proper degree, they are pulled out of the furnace and guided to the rolls B B by a flat guide-plate, $a$, with side flanges, $a'$. These rolls form the blank into a semicircle and pass it along to the second pair of rolls, $C'$ $C^2$, through the guide-tube D. The guide-tube D completes the formation of the tube, which is then welded along its seam by the welding-ball and the welding-rolls. As the blank is forced forward by the first pair of rolls its pointed end projects through the groove $c$ of the rolls $C'$ $C^2$ and passes into the jaws $l l$, strikes against the pin N, and swings it up, thus allowing the jaws to come together and grasp the blank, and the end of the arm L, descending, causes one or the other of the hooks thereon to engage with the chain J. The jaws then more firmly grasp the end of the blank and the carriage moves backwardly with the chain until the entire section of pipe is completed. When the hooks first engage with the chain, the springs at their backs take up a portion of the strain, so as to prevent a too sudden pull on the pipe, which might cause the jaws $l$ $l$ to loose their grasp. When the carriage has run the length of the track, and the entire section of pipe is completed, the end of the lever L strikes against an inclined stop, O, at the end of the track and is lifted up, thereby disengaging the hooks from the chain and opening the jaws. The pipe is then removed, the pin N drops down into place, and the carriage returns to the front end of the track. The return of the carriage may be effected either by having the track set at a slight incline, or in any other desired manner.

In Fig. 4 of the drawings we have shown a detail view of the forming-rolls with a blank in section.

It will be observed that the tongue on the upper roll is somewhat deeper than the groove in the lower roll, and that the flat surfaces of the rolls do not bear on each other. The blank is formed of such width that when in position between the rolls its edges are slightly above the surface of the lower roll and do not touch the surface of either roll, the object of such construction being to prevent any possibility of the edges of the blank becoming chilled by contact with the rolls, which would prevent the perfect welding of the said edges when they came in contact.

The advantages of our invention are, briefly, that the forming and welding of the blank are accomplished with but a single heating of the same. The welding-ball being always in the rear of the completed portion of the pipe, there is no danger of its becoming jammed in the pipe by the accumulation of scale thereon.

The feeding of the blank being accomplished by pulling it from the rolls, there is no danger of the blank buckling or doubling up between the two sets of rolls. The guiding and forming tube between the rolls further aids to prevent the buckling or doubling up of the blank between the forming and welding rolls.

Having described our invention, we claim—

1. In a machine for making pipe, the combination, with the forming and welding rolls, of a welding-ball arranged between the welding-rolls and a gripping device and endless chain operating in unison with said rolls for grasping the end of the pipe and drawing it through said rolls, as set forth.

2. In a pipe-machine, the combination, with the forming and welding rolls, of means, substantially as described, for automatically grasping the pipe and drawing it through the rolls, as set forth.

3. In a pipe-welding machine, the combination of two pairs of rolls and a welding-ball arranged between the second pair of rolls, with a feeding device comprising a pair of tongs arranged behind the second pair of rolls, and means, substantially as described, for causing the said tongs to grasp the end of the blank as it comes from the rolls and draw it out of the same, as set forth.

4. In a pipe-machine, the combination, with the rolls, of the endless chain J, carriage K, and levers L L, having jaws *l l*, and depending hooks M M, substantially as set forth.

5. In a pipe-machine, the combination, with the rolls, of a feeding device comprising an endless chain, a carriage, a pair of tongs carried thereby, and a spring-coupling device, I, adapted to connect said carriage to the chain and to yield slightly when first engaging with the chain, substantially as described.

In testimony that we claim the foregoing as our own we have hereunto affixed our signatures, this 16th day of May, A. D. 1884, in the presence of two witnesses.

GEORGE RUSSELL.
D. RUSH WOOD.

Witnesses:
 JOS. B. CONNOLLY,
 ALVA A. MOORE.